United States Patent
Tsimhoni et al.

(10) Patent No.: US 12,043,115 B2
(45) Date of Patent: Jul. 23, 2024

(54) CONTROL SYSTEM COMPRISING FIRST, SECOND, AND THIRD INPUTS AND FIRST, SECOND, AND THIRD DISPLAYS, AND A METHOD OF OPERATING THE SAME

(71) Applicant: GM Global Technology Operations LLC, Detroit, MI (US)

(72) Inventors: Omer Tsimhoni, Bloomfield Hills, MI (US); John Wesley Phillips, Macomb, MI (US); Erik Robert Bare, Madison Heights, MI (US); Gustav Franz Gerlach, V, Oakland Township, MI (US); Scott Thomas Martin, Trenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 369 days.

(21) Appl. No.: 17/539,566

(22) Filed: Dec. 1, 2021

(65) Prior Publication Data

US 2023/0166598 A1 Jun. 1, 2023

(51) Int. Cl.
*B60K 35/10* (2024.01)
*B60K 35/28* (2024.01)
(Continued)

(52) U.S. Cl.
CPC .............. *B60K 35/10* (2024.01); *B60K 35/60* (2024.01); *B60K 35/28* (2024.01); *B60K 35/65* (2024.01);
(Continued)

(58) Field of Classification Search
CPC ........ B60K 35/10; B60K 35/60; B60K 35/65; B60K 35/28; B60K 2360/731; B60K 2360/168
(Continued)

(56) References Cited

U.S. PATENT DOCUMENTS 9,530,065 B2 12/2016 Tsimhoni et al.
10,394,320 B2 * 8/2019 George-Svahn ........ G06F 3/014
(Continued)

FOREIGN PATENT DOCUMENTS

CN 108733285 A * 11/2018 ........... G06F 3/0484

OTHER PUBLICATIONS

Yang Bian, Influence of prompt timing and messages of an audio navigation system on driver behavior on an urban expressway with five exits, May 19, 2021, Elsevier, Accident Analysis and Prevention (Year: 2021).*

(Continued)

*Primary Examiner* — Elaine Gort
*Assistant Examiner* — Matthias S Weisfeld
(74) *Attorney, Agent, or Firm* — Vivacqua Crane, PLLC (57) ABSTRACT

A control system for a vehicle comprises a controller comprising a processor and a non-transitory computer-readable medium including instructions. The system comprises first, second, and third inputs configured to be manipulated by an operator. The system comprises first, second, and third displays adjacent the first, second, and third inputs, respectively. The first, second and third displays are configured to show first, second, and third indicia, respectively. Manipulation of the first input by the operator transmits a selection input signal to the controller. The controller receives the selection input signal. The processor compares the selection input signal to the instructions in the non-transitory computer-readable medium, transmits a selection output signal to the second and third displays, removes the second and third indicia from the second and third displays, and shows a first sub-selection indicium on the second display and a second sub-selection indicium on the third display.

16 Claims, 3 Drawing Sheets

(51) Int. Cl.
*B60K 35/60* (2024.01)
*B60K 35/65* (2024.01)

(52) U.S. Cl.
CPC .. *B60K 2360/168* (2024.01); *B60K 2360/731* (2024.01)

(58) Field of Classification Search
USPC .......................................................... 701/36
See application file for complete search history.

(56) References Cited

U.S. PATENT DOCUMENTS

| | | | | |
|---|---|---|---|---|
| 2008/0229202 A1* | 9/2008 | Fang | ...................... | H04N 7/163 |
| | | | | 348/E7.061 |
| 2014/0196098 A1* | 7/2014 | Wen | ................. | H04N 21/41422 |
| | | | | 725/75 |
| 2018/0126901 A1* | 5/2018 | Levkova | ............... | B60W 40/09 |
| 2019/0196679 A1* | 6/2019 | You | ....................... | G06F 3/0484 |
| 2020/0117187 A1* | 4/2020 | Kothari | .................. | G06F 21/31 |

OTHER PUBLICATIONS

Menu (computing), retrieved from the internet on Mar. 4, 2022, 4 pages, Wikipedia, <https://en.wikipedia.org/wiki/Menu_(computing)>.

Soft Key, retrieved from the internet on Mar. 4, 2022, 3 pages, Wikipedia, <https://en.wikipedia.org/wiki/Soft_key>.

Soft Key, PCMag Encyclopedia, The Computer Language Co Inc., retrieved from the internet on Mar. 4, 2022, 5 pages, <https://www.pcmag.com/encyclopedia/term/soft-key>.

* cited by examiner

CONTROL SYSTEM COMPRISING FIRST, SECOND, AND THIRD INPUTS AND FIRST, SECOND, AND THIRD DISPLAYS, AND A METHOD OF OPERATING THE SAME

The present disclosure relates to a control system, and more particularly to a control system comprising first, second, and third inputs and first, second, and third displays.

In recent years, the number of electronic control systems and the functionality of the control systems have increased in vehicles. These control systems require input from the operator within the interior of the vehicle, typically through a button, toggle, lever, knob, touch screen, etc. The control systems may operate various features of the vehicle, such as the radio, HVAC, telecommunications, ride control, transmission, etc. Often, each of these systems include various selections and sub-selections, which require the use of numerous buttons, toggles, etc. to support the vast array functions. However, modern vehicle design favors a minimalist approach that decreases the overall complexity of the interior and is aesthetically pleasing to an operator.

Thus, while current control systems achieve their intended purpose, there is a need for a new control system that addresses these issues.

SUMMARY

According to several aspects of the present disclosure, a control system for a vehicle comprises a controller comprising at least one processor and at least one non-transitory computer-readable medium including instructions. The control system further comprises first, second, and third inputs configured to be manipulated by an operator and in electronic communication with the controller. The control system further comprises first, second, and third displays adjacent the first, second, and third inputs, respectively, and in electronic communication with the controller. The first, second and third displays are configured to show first, second, and third indicia, respectively. Manipulation of the first input by the operator transmits a selection input signal to the controller. The controller is configured to receive the selection input signal. The processor is programmed to compare the selection input signal to the instructions in the at least one non-transitory computer-readable medium, transmit a selection output signal to the second and third displays, remove the second and third indicia from the second and third displays, and show a first sub-selection indicium on the second display and a second sub-selection indicium on the third display.

In one aspect, manipulation of one of the second and third inputs by the operator transmits a sub-selection input signal to the controller. The controller is configured to receive the sub-selection input signal and the processor is programmed to compare the sub-selection input signal to the instructions in the at least one non-transitory computer-readable medium, transmit a sub-selection output signal to the first, second, and third displays, remove the first indicium from the first display and the first and second sub-selection indicia from the second and third displays, respectively, and show the one of the first and second sub-selection indicia corresponding with the sub-selection input signal on the first display and the second and third indicia on the second and third displays, respectively.

In another aspect, the processor is programmed to show the first sub-selection indicium on the second display and the second sub-selection indicium on the third display for a time limit.

In another aspect, the processor is programmed to remove the first and second sub-selection indicia from the second and third displays, respectively after the time limit ends, and show the second and third indicia on the second and third displays, respectively.

In another aspect, the time limit is determined by a vehicle input corresponding to an operator's attention to driving the vehicle.

In another aspect, the vehicle input comprises at least one of: a visual demand of driving the vehicle, a motion behavior of the vehicle, a gaze behavior of the operator, a navigation input, a quantity of the sub-selection indicia, and a memory of the past interactions between the operator and the control system stored in the at least one non-transitory computer-readable medium.

In another aspect, the control system further comprises an output device in electronic communication with the controller and arranged to change between at least a first setting and a second setting. The controller is configured to receive the sub-selection input signal and the processor is programmed to compare the sub-selection input signal to the instructions in the at least one non-transitory computer-readable medium and transmit a device signal to the output device to change the output device to one of the first and second settings.

In another aspect, the output device further comprises a cabin comfort module configured to change an environment within the vehicle between a first comfort mode and a second comfort mode, with the first comfort mode corresponding to the first setting and a second comfort mode corresponding to the second setting.

According to several aspects of the present disclosure, a method of operating a control system for a vehicle is presented. The control system comprises a controller comprising at least one processor and at least one non-transitory computer-readable medium including instructions. The control system comprises first, second, and third inputs in electronic communication with the controller and first, second, and third displays adjacent the first, second, and third inputs, respectively, and in electronic communication with the controller. The method comprises showing first, second, and third indicia on the first, second and third displays, respectively, performing a manipulation of the first input with an operator, transmitting a selection input signal from the first input to the controller, and receiving the selection input signal with the controller. The method further comprises comparing the selection input signal with the processor to the instructions in the at least one non-transitory computer-readable medium, transmitting a selection output signal from the controller to the second and third displays, removing the second and third indicia from the second and third displays, and showing a first sub-selection indicium on the second display and a second sub-selection indicium on the third display.

In one aspect, the method comprises performing a manipulation of one of the second and third inputs with the operator, transmitting a sub-selection input signal to the controller, receiving the sub-selection input signal with the controller, and comparing the sub-selection input signal with the processor to the instructions in the at least one non-transitory computer-readable medium. The method further comprises transmitting a sub-selection output signal from the controller to the first, second, and third displays, removing the first indicium from the first display and the first and second sub-selection indicia from the second and third displays, respectively, and showing the one of the first and second sub-selection indicia corresponding with the sub-selection input signal on the first display and the second and third indicia on the second and third displays, respectively.

In another aspect, showing the first sub-selection indicium on the second display and the second sub-selection indicium on the third display is further defined as showing the first sub-selection indicium on the second display and the second sub-selection indicium on the third display for a time limit.

In another aspect, the method further comprises removing the first and second sub-selection indicia from the second and third displays, respectively after the time limit ends and showing the second and third indicia on the second and third displays, respectively.

In another aspect, the method further comprises receiving a vehicle input corresponding to an operator's attention to driving the vehicle and determining the time limit from the vehicle input with the processor.

In another aspect, determining the time limit from the vehicle input with the processor occurs prior to transmitting a sub-selection output signal from the controller to the first, second, and third displays.

In another aspect, determining the time limit from the vehicle input with the processor occurs concurrently with transmitting a sub-selection output signal from the controller to the first, second, and third displays.

In another aspect, the vehicle input comprises at least one of: a visual demand of driving the vehicle, a motion behavior of the vehicle, a gaze behavior of the operator, a navigation input, a quantity of the sub-selection indicia, and a memory of the past interactions between the operator and the control system stored in the at least one non-transitory computer-readable medium.

In another aspect, the control system further comprises an output device in electronic communication with the controller and arranged to change between at least a first setting and a second setting. The method further comprises transmitting a device signal to the output device to change the output device to one of the first and second settings after comparing the sub-selection input signal to the instructions in the at least one non-transitory computer-readable medium.

In another aspect, the output device further comprises a cabin comfort module configured to change an environment within the vehicle between a first comfort mode and a second comfort mode, with the first comfort mode corresponding to the first setting and a second comfort mode corresponding to the second setting. Transmitting the device signal to the output device to change the output device to one of the first and second settings is further defined as transmitting the device signal to the cabin comfort module to change the cabin comfort module to one of the first and second comfort modes.

According to several aspects of the present disclosure, a method of operating a control system for a vehicle is presented. The control system comprises a controller comprising at least one processor and at least one non-transitory computer-readable medium including instructions. The control system comprises first, second, and third inputs in electronic communication with the controller and first, second, and third displays adjacent the first, second, and third inputs, respectively, and in electronic communication with the controller. The method comprises showing first, second, and third indicia on the first, second and third displays, respectively, performing a manipulation of the first input with an operator, transmitting a selection input signal from the first input to the controller, receiving the selection input signal with the controller, and comparing the selection input signal with the processor to the instructions in the at least one non-transitory computer-readable medium. The method further comprises transmitting a selection output signal from the controller to the second and third displays, removing the second and third indicia from the second and third displays, and showing a first sub-selection indicium on the second display and a second sub-selection indicium on the third display for a time limit. The method further comprises performing a manipulation of one of the second and third inputs with the operator, transmitting a sub-selection input signal to the controller, receiving the sub-selection input signal with the controller, and comparing the sub-selection input signal with the processor to the instructions in the at least one non-transitory computer-readable medium. The method further comprises transmitting a sub-selection output signal from the controller to the first, second, and third displays, removing the first indicium from the first display and the first and second sub-selection indicia from the second and third displays, respectively, and showing the one of the first and second sub-selection indicia corresponding with the sub-selection input signal on the first display and the second and third indicia on the second and third displays, respectively.

In one aspect, the method further comprises receiving a vehicle input corresponding to an operator's attention to driving the vehicle and determining the time limit from the vehicle input with the processor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
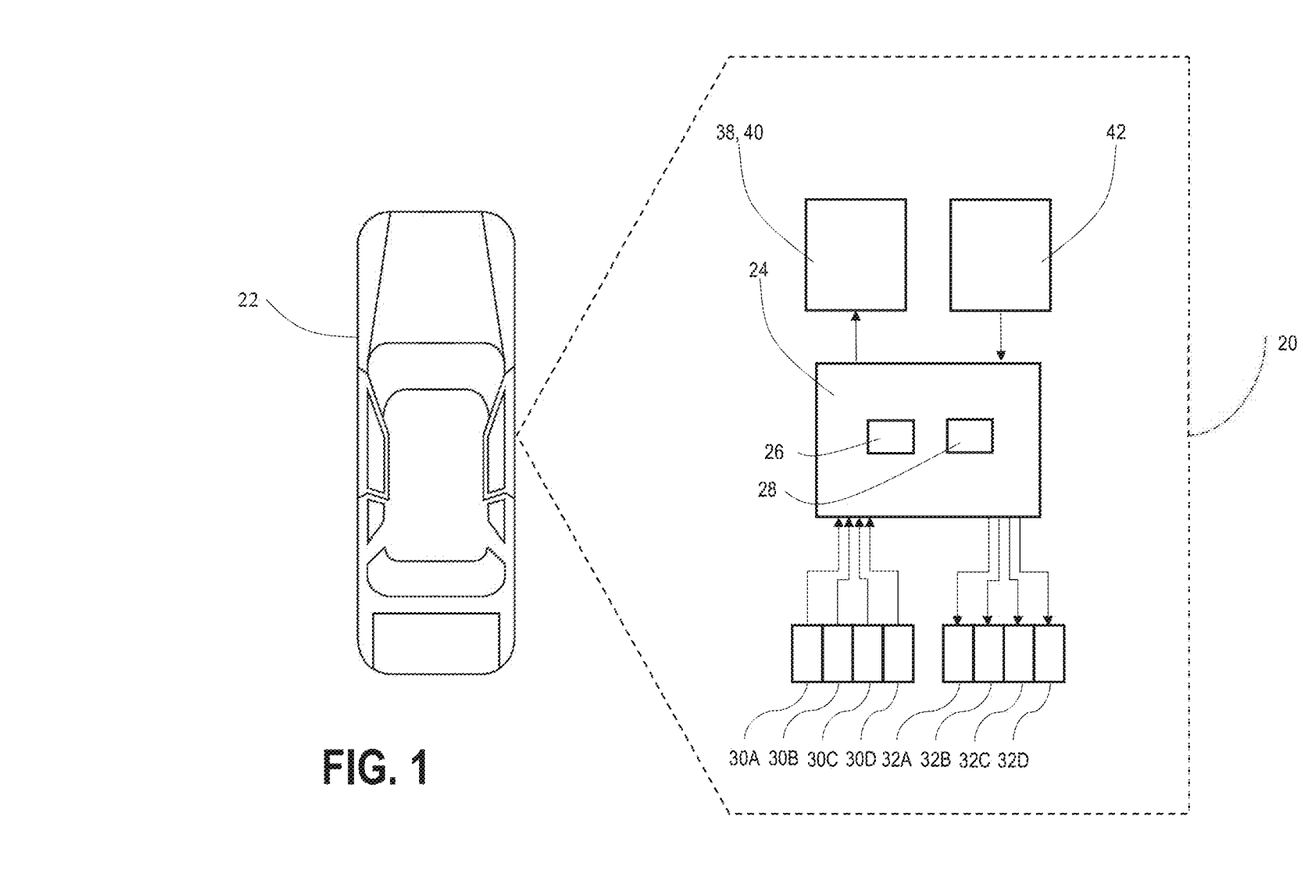
FIG. 1 is a schematic view of one example of a vehicle comprising a control system including a controller, an output device, a vehicle input, inputs, and displays.

Referring to FIG. 1, a control system is shown generally at 20. The control system 20 is configured for use with a vehicle 22. The control system 20 comprises a controller 24 comprising at least one processor 26 and at least one non-transitory computer-readable medium 28 including instructions. The at least one non-transitory computer-readable medium 28 may include other data such as control logic, software applications, instructions, computer code, data, lookup tables, etc. A computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. The non-transitory computer readable medium 28 may include media where data can be permanently stored and media where data can be stored and later overwritten, such as a rewritable optical disc or an erasable memory device. Computer code includes any type of program code, including source code, object code, and executable code. The processor 26 is configured to execute the code or instructions.

Figure 2:
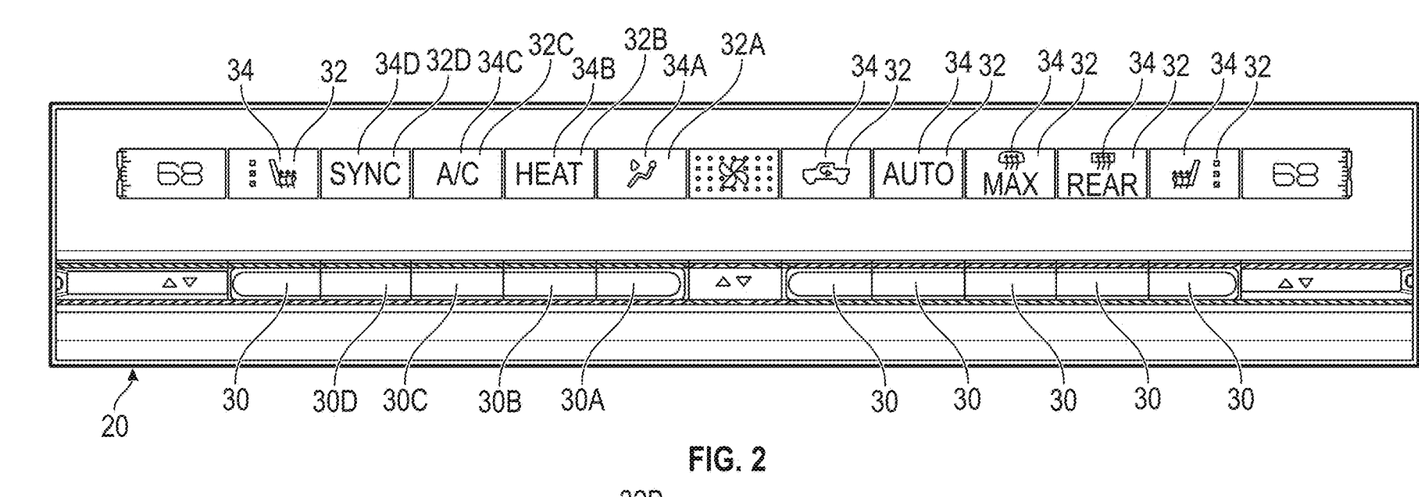
FIG. 2 is an elevational view of one example of the control system showing first, second, and third inputs and first, second, and third displays having first, second, and third indicia, respectively.
Figure 3:
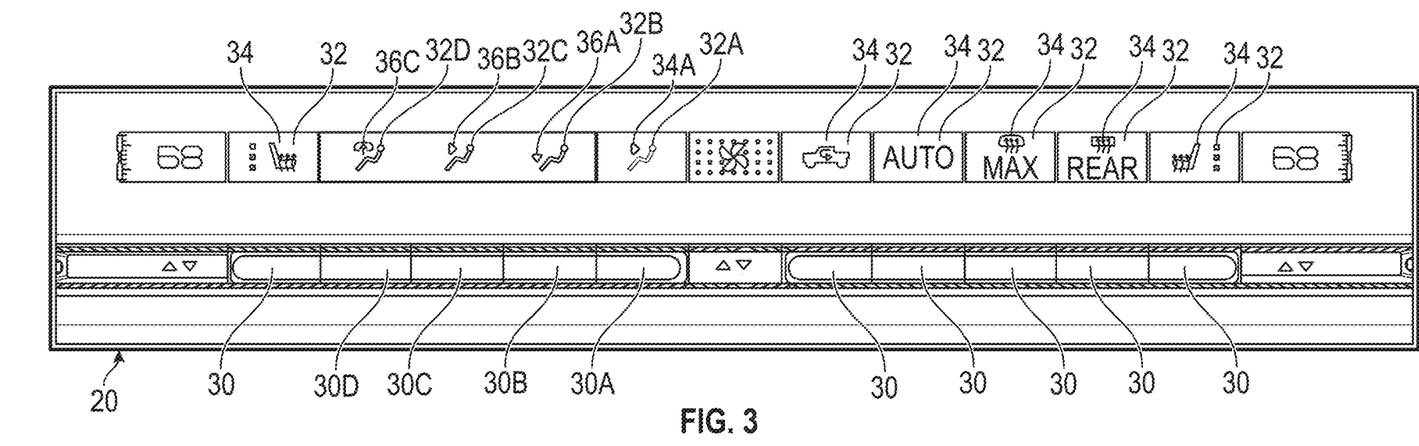
FIG. 3 is an elevational view of the control system of FIG. 3, showing the first, second, and third inputs and the first, second, and third displays, with the first display showing the first indicium and the second and third displays showing the first and second sub-selection indicia, respectively.

The control system 20 further comprises first, second, and third inputs 30A-C configured to be manipulated by an operator and in electronic communication with the controller 24. As shown in FIGS. 2 and 3, the first, second, and third inputs 30A-C are configured as toggles arranged to pivot when manipulated by the operator. However, the first, second, and third inputs 30A-C may be configured as buttons, slides, knobs, etc. configured to move linearly along an axis, translate along a surface, rotate around an axis, etc. Furthermore, the manipulation of the first, second, and third inputs 30A-C may comprise engagement with the first, second, and third inputs 30A-C that does not involve movement, such as the first, second, and third inputs 30A-C configured as touch sensors.

Returning to FIG. 1, the control system 20 further comprises first, second, and third displays 32A-C adjacent the first, second, and third inputs 30A-C, respectively, and in electronic communication with the controller 24. The first, second and third displays 32A-C are configured to show first, second, and third indicia 34A-C, respectively. With reference to FIGS. 2 and 3, the first, second, and third displays 32A-C may be configured as one or more screens capable of displaying an image. The first, second, and third displays 32A-C may also be backlight displays, or any other suitable mechanism for showing the indicia 34. The indicia 34 may comprise text, icons, or the like. In the example shown in FIGS. 2 and 3, the inputs 30 and the displays 32 are disposed within an interior of the vehicle 22. More specifically, the inputs 30 and the displays 32 are mounted to a portion of the vehicle 22 that is within reach of the operator of the vehicle 22, such as along a dashboard or a center console of the vehicle 22. However, the inputs 30 and the displays 32 may be utilized in any suitable location on the vehicle 22.

Manipulation of the first input 30A by the operator transmits a selection input signal to the controller 24. The controller 24 is configured to receive the selection input signal. The processor 26 is programmed to compare the selection input signal to the instructions in the at least one non-transitory computer-readable medium 28, transmit a selection output signal to the second and third displays 32A-C, remove the second and third indicia 34B, 34C from the second and third displays 32A-C (shown in FIG. 2), and show a first sub-selection indicium 36A on the second display 32B and a second sub-selection indicium 36B on the third display 32C (shown in FIG. 3). Furthermore, manipulation of one of the second and third inputs 30B, 30C by the operator transmits a sub-selection input signal to the controller 24. The controller 24 is configured to receive the sub-selection input signal and the processor 26 is programmed to compare the sub-selection input signal to the instructions in the at least one non-transitory computer-readable medium 28, transmit a sub-selection output signal to the first, second, and third displays 32A-C, remove the first indicium 34A from the first display 32A and the first and second sub-selection indicia 36A, 36B from the second and third displays 32B, 32C, respectively, and show the one of the first and second sub-selection indicia 36A, 36B corresponding with the sub-selection input signal on the first display 32A and the second and third indicia 34B, 34C on the second and third displays 32B, 32C, respectively (see FIG. 2).

With reference to FIG. 1, the control system 20 further comprises an output device 38 in electronic communication with the controller 24 and arranged to change between at least a first setting and a second setting. The controller 24 is configured to receive the sub-selection input signal and the processor 26 is programmed to compare the sub-selection input signal to the instructions in the at least one non-transitory computer-readable medium 28 and transmit a device signal to the output device 38 to change the output device 38 to one of the first and second settings. In one example, the output device 38 further comprises a cabin comfort module 40 configured to change an environment within the vehicle 22 between a first comfort mode and a second comfort mode, with the first comfort mode corresponding to the first setting and a second comfort mode corresponding to the second setting. More specifically, the cabin comfort module 40 may control the radio, the HVAC, and other systems that alter the environment within the vehicle 22. However, the output device 38 may comprise any other suitable vehicle component, such as a ride control module and a transmission, as examples.

Accordingly, the manipulation of the first input 30A by the operator and the transmission of the selection input signal to the controller 24 resulting in the removal of the second and third indicia 34B, 34C from the second and third displays 32B, 32C, followed by the first and second sub-selection indicia 36A, 36B being shown on the second and third displays 32B, 32C, respectively, allows for functionality of the control system 20 that is greater than the number of inputs 30. More specifically, the manipulation of the first input 30A opens a menu of additional functions that may be performed, which reduces the number of inputs 30 that must be present in the vehicle 22, which is aesthetically pleasing, reduces clutter, and follows a minimalist design concept. In the example shown in FIG. 2, the first input 30A and first display 32A correspond with the vent selection from which air leaves the HVAC system. The second input 30B and second display 32B correspond with the heating controls of the HVAC system. The third input 30C and third display 32C correspond with the air-conditioning controls of the HVAC system. The control system 20 further comprises a fourth input 30D and a fourth display 32D that show a fourth indicium 34D. The fourth input 30D and fourth display 32D correspond with the synchronization of the HVAC controls throughout the vehicle 22. As shown in FIG. 3, manipulation of the first input 30A removes the second, third, and fourth indicia 34B-C from the second, third, and fourth displays 32B-D. The first and second sub-selection indicia 36A, 36B are displayed on the second and third displays 32B, 32C and a third sub-selection indicium 36C is displayed on the fourth display 32D. The first sub-selection indicium 36A indicates that manipulation of the second input 30B would correspond with selecting the vent that blows at the occupant's feet. The second sub-selection indicium 36B indicates that manipulation of the third input 30C would correspond with selecting the vent that blows at the occupant's torso. The third sub-selection indicium 36C indicates that manipulation of the fourth input 30D would correspond with selecting the vent that blows at the windshield for defrosting. Therefore, the functionality of the second, third, and fourth inputs 30B-D have changed from being related to the heating, air conditioning, and synchronization systems to sub-selections of the vent system.

The terms "first," "second," "third," "fourth," etc. are general and are not associated with any particular display 32 or input 30, nor any particular order or importance. While certain inputs 30 and displays 32 are labeled in FIGS. 2 and 3 as "first," "second," "third," and "fourth" (see description above), this is for the purpose of the specific example described above. Any of the inputs 30 and the displays 32 shown in FIGS. 2 and 3, may be the first input and the first display. More specifically, the first input corresponds to any input 30 that may be manipulated and result in the removal of the indicia 34 over other inputs 30 and replaced with the sub-selection indicia 36. For example, the input 30 corresponding with heat system shown in FIG. 2 may function as the first input. More specifically, manipulation of the input 30 for the heat system may cause removal of other indicia 34 (such as those shown on the displays 32 for the vent system, the air conditioning system, the synchronization system, etc.) and replacement with the sub-selection indicia 36 (such as heat range selections). Furthermore, although four inputs 30 and four displays 32 are described in the example above, any number of inputs 30 and displays 32 may be present. In the example shown in FIGS. 2 and 3, ten inputs 30 and ten displays 32 are shown. As such, in this example selection of any input 30 could result in the removal of up to nine indicia 34 over the other inputs 30 and replacement with up to nine sub-selection indicia 36.

Returning to the example shown in FIGS. 2 and 3, manipulation of any of the second, third, and fourth inputs 30B-D showing the first, second, and third sub-selection indicia 36A-C would cause the corresponding sub-selection indicia 36 to be shown on the first display 32A (i.e., showing the indicium 34 that shows the vent for the feet, the vent for the torso, or the vent for the windshield defrost). The second, third, and fourth displays 32B-D would then return to showing the second, third, and fourth indicia 34B-D (i.e., the heating system, the air conditioning system, and the synchronization system). In another example, the selection of any of the second, third, and fourth displays 32B-D would switch that system on or off. As such, the first display 32A could show (for example) an indicium 34 that shows two or more of the feet vent, the torso vent, and the windshield defrost being selected and active.

With reference to FIG. 3, the processor 26 may be programmed to show the first sub-selection indicium 36A on the second display 32B and the second sub-selection indicium 36B on the third display 32C for a time limit. The processor 26 is programmed to remove the first and second sub-selection indicia 36A, 36B from the second and third displays 32B, 32C, respectively after the time limit ends, and show the second and third indicia 34B, 34C on the second and third displays 32B, 32C, respectively. More specifically, the control system 20 will return to displaying the first, second, third (etc.) displays 32 if no sub-selection is made within the time limit to prevent indefinitely showing the sub-selections and allow the operator to access the initial selections. The time limit may be determined by a vehicle input 42 corresponding to an operator's attention to driving the vehicle 22 (see FIG. 1). For example, the vehicle input 42 may comprise at least one of: a visual demand of driving the vehicle 22, a motion behavior of the vehicle 22, a gaze behavior of the operator, a navigation input, a quantity of the sub-selection indicia 36, and a memory of the past interactions between the operator and the control system 20 stored in the at least one non-transitory computer-readable medium 28. The visual demand of driving the vehicle 22 may refer to traffic conditions, pedestrian conditions, road obstacles, roadway conditions, etc. that can be ascertained from systems such as LIDAR, forward-facing vehicle cameras, and the like. The motion behavior of the vehicle 22 may refer to dynamic vehicle conditions such as acceleration, braking, and steering. The gaze behavior of the operator may be obtained through camera(s) within the interior of vehicle 22 that are focused on the operator and monitor the positioning of the operator's face, eyes, etc. to determine where the operator is looking, with the intent to maintain the driver's attention on the road. The navigation input refers to features of the vehicle's 22 intended path that may require additional operator attention (such as a curve), which may be ascertained from the vehicle's 22 navigation system. The quantity of the sub-selection indicia 36 refers to the number of sub-selections that are shown on the displays 32 after a selection. More sub-selection indicia 36 require more attention from the operator. The processor 26 may ascertain the time limit by referencing the vehicle inputs 42 collectively. More specifically, if the operator and/or the vehicle 22 is engaged in driving behaviors that draws more attention away from the displays 32 than "normal" driving conditions, then the time limit will be longer in accordance with the delay the conditions are causing. Furthermore, the greater the number of sub-selections, the greater the time limit. The time limit dynamically changes with conditions to ensure that the sub-selection indicia 36 are shown an adequate amount of time to allow the operator to analyze the sub-selection indicia 36 and manipulate the corresponding input 30, while preventing the sub-selection indicia 36 from being shown indefinitely.

Figure 4:
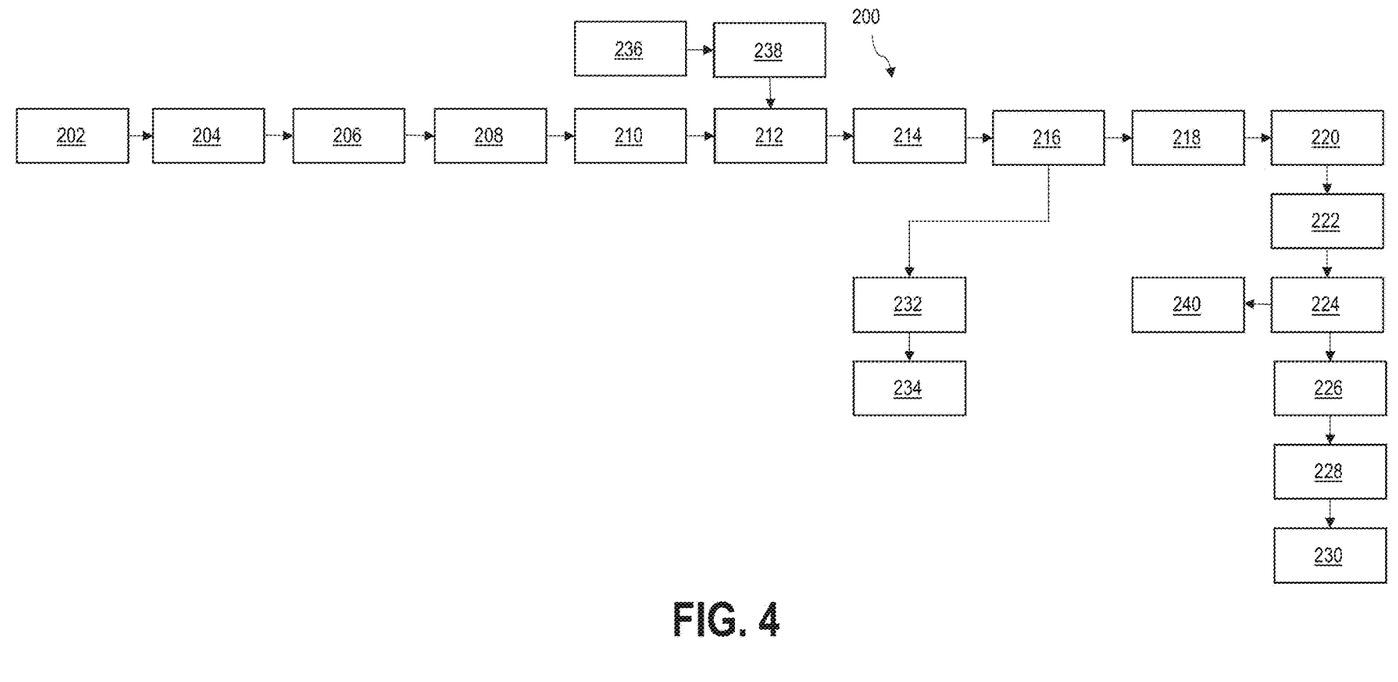
FIG. 4 is a is a flow chart showing one example of a method of operating the control system.

A method 200 of operating the control system 20 is also disclosed herein and shown in FIG. 4. The method 200 comprises showing first, second, and third indicia 34A-C on the first, second and third displays 32A-C, respectively (see box 202), performing a manipulation of the first input 30A with the operator (see box 204), transmitting a selection input signal from the first input 30A to the controller 24 (see box 206), and receiving the selection input signal with the controller 24 (see box 208). The method 200 further comprises comparing the selection input signal with the processor 26 to the instructions in the at least one non-transitory computer-readable medium 28 (see box 210), transmitting a selection output signal from the controller 24 to the second and third displays 32B, 32C (see box 212), removing the second and third indicia 34B, 34C from the second and third displays 32B, 32C (see box 214), and showing the first sub-selection indicium 36A on the second display 32B and the second sub-selection indicium 36B on the third display 32C (see box 216).

The method 200 may further comprise performing a manipulation of one of the second and third inputs 30B, 30C with the operator (see box 218), transmitting the sub-selection input signal to the controller 24 (see box 220), receiving the sub-selection input signal with the controller 24 (see box 222), and comparing the sub-selection input signal with the processor 26 to the instructions in the at least one non-transitory computer-readable medium 28 (see box 224). The method 200 may further comprise transmitting the sub-selection output signal from the controller 24 to the first, second, and third displays 32A-C (see box 226), removing the first indicium 34A from the first display 32A and the first and second sub-selection indicia 36A, 36B from the second and third displays 32B, 32C, respectively (see box 228), and showing the one of the first and second sub-selection indicia 36A, 36B corresponding with the sub-selection input signal on the first display 32A and the second and third indicia 34B, 34C on the second and third displays 32B, 32C, respectively (see box 230).

In one example, showing the first sub-selection indicium 36A on the second display 32B and the second sub-selection indicium 36B on the third display 32C (see box 216) is further defined as showing the first sub-selection indicium 36A on the second display 32B and the second sub-selection indicium 36B on the third display 32C for the time limit. The method 200 may further comprise removing the first and second sub-selection indicia 36A, 36B from the second and third displays 32B, 32C, respectively after the time limit ends (see box 232) and showing the second and third indicia 34B, 34C on the second and third displays 32B, 32C, respectively (see box 234). In one example, the method 200 further comprises receiving the vehicle input 42 corresponding to an operator's attention to driving the vehicle 22 (see box 236) and determining the time limit from the vehicle input 42 with the processor 26 (see box 238). The vehicle input 42 may comprise at least one of: the visual demand of driving the vehicle 22, the motion behavior of the vehicle 22, the gaze behavior of the operator, the navigation input, the quantity of the sub-selection indicia 36, and the memory of the past interactions between the operator and the control system stored in the at least one non-transitory computer-readable medium 28.

In one example, determining the time limit from the vehicle input 42 with the processor 26 (see box 238) may occur prior to transmitting the sub-selection output signal from the controller 24 to the first, second, and third displays 32A-C (see box 226). In another example, determining the time limit from the vehicle input 42 with the processor 26 (see box 238) occurs concurrently with transmitting the sub-selection output signal from the controller 24 to the first, second, and third displays 32A-C (see box 226).

The method 200 may further comprise transmitting the device signal to the output device 38 to change the output device 38 to one of the first and second settings (see box 240) after comparing the sub-selection input signal to the instructions in the at least one non-transitory computer-readable medium 28 (see box 224). In one example, the output device 38 further comprises the cabin comfort module 40. In this example, transmitting the device signal to the output device 38 to change the output device 38 to one of the first and second settings (see box 240) is further defined as transmitting the device signal to the cabin comfort module 40 to change the cabin comfort module 40 to one of the first and second comfort modes.

Accordingly, the control system 20 offers several advantages. The manipulation of the first input 30A to show the first and second sub-selection indicia 36A, 36B opens additional functions that may be performed by the control system 20. In turn the number of inputs 30 that must be present in the vehicle 22 to perform the functions are reduced, which is aesthetically pleasing to the operator, reduces clutter within the vehicle, and follows a minimalist design concept.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A control system for a vehicle, the control system comprising:

a controller comprising at least one processor and at least one non-transitory computer-readable medium including instructions;

first, second, and third inputs configured to be manipulated by an operator and in electronic communication with the controller;

first, second, and third displays adjacent the first, second, and third inputs, respectively, and in electronic communication with the controller, wherein the first, second and third displays configured to show first, second, and third indicia, respectively;

wherein manipulation of the first input by the operator transmits a selection input signal to the controller;

wherein the controller is configured to receive the selection input signal and the processor is programmed to:
compare the selection input signal to the instructions in the at least one non-transitory computer-readable medium;
transmit a selection output signal to the second and third displays;
remove the second and third indicia from the second and third displays;
show a first sub-selection indicium on the second display and a second sub-selection indicium on the third display;

wherein the processor is programmed to show the first sub-selection indicium on the second display and the second sub-selection indicium on the third display for a time limit;

wherein the time limit is determined by a vehicle input corresponding to an operator's attention to driving the vehicle, wherein the vehicle input comprises:

a visual demand of driving the vehicle;

a motion behavior of the vehicle;

a gaze behavior of the operator;

a navigation input;

a quantity of sub-selection indicia;

a memory of past interactions between the operator and the control system stored in the at least one non-transitory computer-readable medium; and wherein the visual demand further comprises: traffic conditions, pedestrian conditions, road obstacles, and roadway conditions; the traffic conditions, pedestrian conditions, road obstacles, and roadway conditions ascertained by LIDAR and forward-facing vehicle cameras, and wherein the quantity of sub-selection indicia further comprises: a quantity of sub-selections shown on displays after the selection input, wherein more sub-selection indicia require more attention from the operator, and wherein the processor ascertains the time limit by referencing the vehicle inputs collectively, such that the time limit dynamically changes with conditions to ensure that sub-selection indicia are shown for an adequate quantity of time to allow the operator to analyze the sub-selection indicia and manipulating a corresponding input while preventing the sub-selection indicia from being shown indefinitely.

2. The control system of claim 1, wherein manipulation of one of the second and third inputs by the operator transmits a sub-selection input signal to the controller; and wherein the controller is configured to receive the sub-selection input signal and the processor is programmed to:
compare the sub-selection input signal to the instructions in the at least one non-transitory computer-readable medium;

transmit a sub-selection output signal to the first, second, and third displays;
remove the first indicium from the first display and the first and second sub-selection indicia from the second and third displays, respectively; and
show the one of the first and second sub-selection indicia corresponding with the sub-selection input signal on the first display and the second and third indicia on the second and third displays, respectively.

3. The control system of claim 2, further comprising an output device in electronic communication with the controller and arranged to change between at least a first setting and a second setting;
wherein the controller is configured to receive the sub-selection input signal and the processor is programmed to:
compare the sub-selection input signal to the instructions in the at least one non-transitory computer-readable medium; and
transmit a device signal to the output device to change the output device to one of the first and second settings.

4. The control system of claim 3, wherein the output device further comprises a cabin comfort module configured to change an environment within the vehicle between a first comfort mode and a second comfort mode, with the first comfort mode corresponding to the first setting and a second comfort mode corresponding to the second setting.

5. The control system of claim 1, wherein the processor is programmed to remove the first and second sub-selection indicia from the second and third displays, respectively after the time limit ends, and show the second and third indicia on the second and third displays, respectively.

6. A method of operating a control system for a vehicle, the control system comprising a controller comprising at least one processor and at least one non-transitory computer-readable medium including instructions, first, second, and third inputs in electronic communication with the controller, first, second, and third displays adjacent the first, second, and third inputs, respectively, and in electronic communication with the controller; the method comprising:
showing first, second, and third indicia on the first, second and third displays, respectively;
performing a manipulation of the first input with an operator;
transmitting a selection input signal from the first input to the controller;
receiving the selection input signal with the controller;
comparing the selection input signal with the processor to the instructions in the at least one non-transitory computer-readable medium;
transmitting a selection output signal from the controller to the second and third displays;
removing the second and third indicia from the second and third displays;
showing a first sub-selection indicium on the second display and a second sub-selection indicium on the third display for a time limit;
performing a manipulation of one of the second and third inputs with the operator;
transmitting a sub-selection input signal to the controller;
receiving the sub-selection input signal with the controller;
comparing the sub-selection input signal with the processor to the instructions in the at least one non-transitory computer-readable medium;
transmitting a sub-selection output signal from the controller to the first, second, and third displays;
removing the first indicium from the first display and the first and second sub-selection indicia from the second and third displays, respectively;
showing the one of the first and second sub-selection indicia corresponding with the sub-selection input signal on the first display and the second and third indicia on the second and third displays, respectively
determining the time limit by a vehicle input corresponding to an operator's attention to driving the vehicle, wherein the vehicle input comprises:
a visual demand of driving the vehicle;
a motion behavior of the vehicle;
a gaze behavior of the operator;
a navigation input;
a quantity of sub-selection indicia;
storing a memory of past interactions between the operator and the control system in the at least one non-transitory computer-readable medium,
wherein the visual demand further comprises: traffic conditions, pedestrian conditions, road obstacles, and roadway conditions; the traffic conditions, pedestrian conditions, road obstacles, and roadway conditions ascertained by LIDAR and forward-facing vehicle cameras; and
wherein the quantity of sub-selection indicia further comprises: a quantity of sub-selections shown on displays after the selection input, wherein the processor ascertains the time limit by referencing the vehicle inputs collectively, such that the time limit dynamically changes with conditions to ensure that sub-selection indicia are shown for an adequate quantity of time to allow the operator to analyze the sub-selection indicia and manipulating a corresponding input while preventing the sub-selection indicia from being shown indefinitely, and wherein more sub-selection indicia require more attention from the operator.

7. The method of claim 6, further comprising:
receiving a vehicle input corresponding to an operator's attention to driving the vehicle; and
determining the time limit from the vehicle input with the processor.

8. A method of operating a control system for a vehicle, the control system comprising a controller comprising at least one processor and at least one non-transitory computer-readable medium including instructions, first, second, and third inputs in electronic communication with the controller, first, second, and third displays adjacent the first, second, and third inputs, respectively, and in electronic communication with the controller; the method comprising:
showing first, second, and third indicia on the first, second and third displays, respectively;
performing a manipulation of the first input with an operator;
transmitting a selection input signal from the first input to the controller;
receiving the selection input signal with the controller;
comparing the selection input signal with the processor to the instructions in the at least one non-transitory computer-readable medium;
transmitting a selection output signal from the controller to the second and third displays;
removing the second and third indicia from the second and third displays;
showing a first sub-selection indicium on the second display and a second sub-selection indicium on the third display;

showing the first sub-selection indicium on the second display and the second sub-selection indicium on the third display for a time limit;

determining the time limit by a vehicle input corresponding to an operator's attention to driving the vehicle, wherein the vehicle input comprises:

a visual demand of driving the vehicle;

a motion behavior of the vehicle;

a gaze behavior of the operator;

a navigation input;

a quantity of sub-selection indicia; and storing a memory of past interactions between the operator and the control system in the at least one non-transitory computer-readable medium, wherein the visual demand further comprises: traffic conditions, pedestrian conditions, road obstacles, and roadway conditions; the traffic conditions, pedestrian conditions, road obstacles, and roadway conditions ascertained by LIDAR and forward-facing vehicle cameras; and wherein the quantity of sub-selection indicia further comprises: a quantity of sub-selections shown on displays after the selection input, wherein the processor ascertains the time limit by referencing the vehicle inputs collectively, such that the time limit dynamically changes with conditions to ensure that sub-selection indicia are shown for an adequate quantity of time to allow the operator to analyze the sub-selection indicia and manipulating a corresponding input while preventing the sub-selection indicia from being shown indefinitely, and wherein more sub-selection indicia require more attention from the operator.

9. The method of claim 8, further comprising:

performing a manipulation of one of the second and third inputs with the operator;

transmitting a sub-selection input signal to the controller;

receiving the sub-selection input signal with the controller;

comparing the sub-selection input signal with the processor to the instructions in the at least one non-transitory computer-readable medium;

transmitting a sub-selection output signal from the controller to the first, second, and third displays;

removing the first indicium from the first display and the first and second sub-selection indicia from the second and third displays, respectively; and showing the one of the first and second sub-selection indicia corresponding with the sub-selection input signal on the first display and the second and third indicia on the second and third displays, respectively.

10. The method of claim 9, wherein the control system further comprises an output device in electronic communication with the controller and arranged to change between at least a first setting and a second setting; and further comprising:

transmitting a device signal to the output device to change the output device to one of the first and second settings after comparing the sub-selection input signal to the instructions in the at least one non-transitory computer-readable medium.

11. The method of claim 10, wherein the output device further comprises a cabin comfort module configured to change an environment within the vehicle between a first comfort mode and a second comfort mode, with the first comfort mode corresponding to the first setting and a second comfort mode corresponding to the second setting;

and wherein transmitting the device signal to the output device to change the output device to one of the first and second settings is further defined as transmitting the device signal to the cabin comfort module to change the cabin comfort module to one of the first and second comfort modes.

12. The method of claim 8, wherein showing the first sub-selection indicium on the second display and the second sub-selection indicium on the third display is further defined as showing the first sub-selection indicium on the second display and the second sub-selection indicium on the third display for the time limit.

13. The method of claim 12, further comprising:

receiving a vehicle input corresponding to an operator's attention to driving the vehicle; and determining the time limit from the vehicle input with the processor.

14. The method of claim 13, wherein determining the time limit from the vehicle input with the processor occurs prior to transmitting a sub-selection output signal from the controller to the first, second, and third displays.

15. The method of claim 13, wherein determining the time limit from the vehicle input with the processor occurs concurrently with transmitting a sub-selection output signal from the controller to the first, second, and third displays.

16. The method of claim 12, further comprising:

removing the first and second sub-selection indicia from the second and third displays, respectively after the time limit ends; and showing the second and third indicia on the second and third displays, respectively.

* * * * *